March 15, 1932. E. M. BERGH 1,849,267
CONTROL FOR EVAPORATING APPARATUS
Filed Jan. 29, 1930
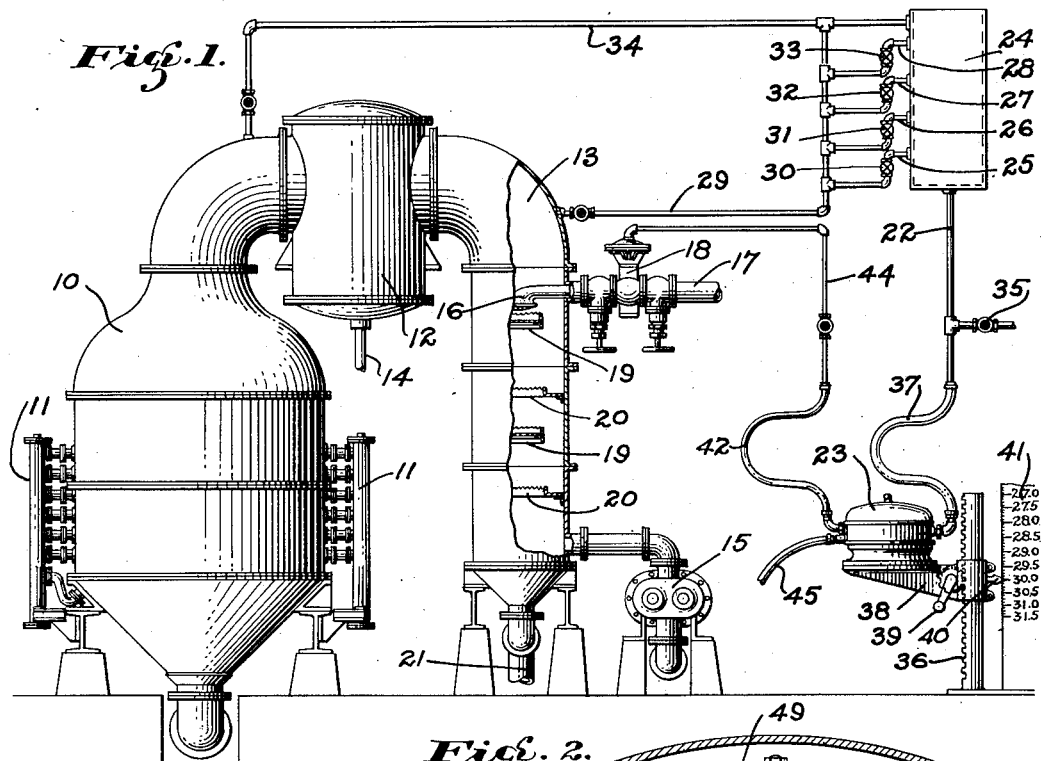
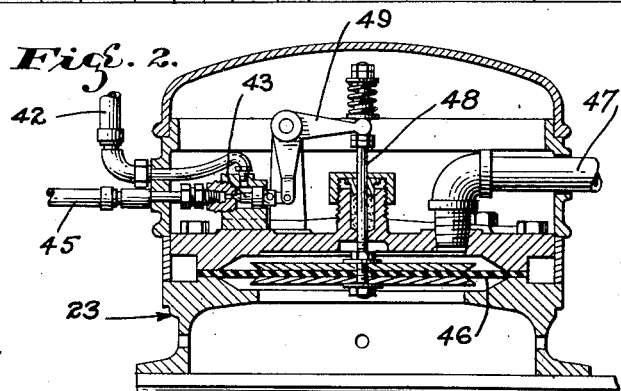
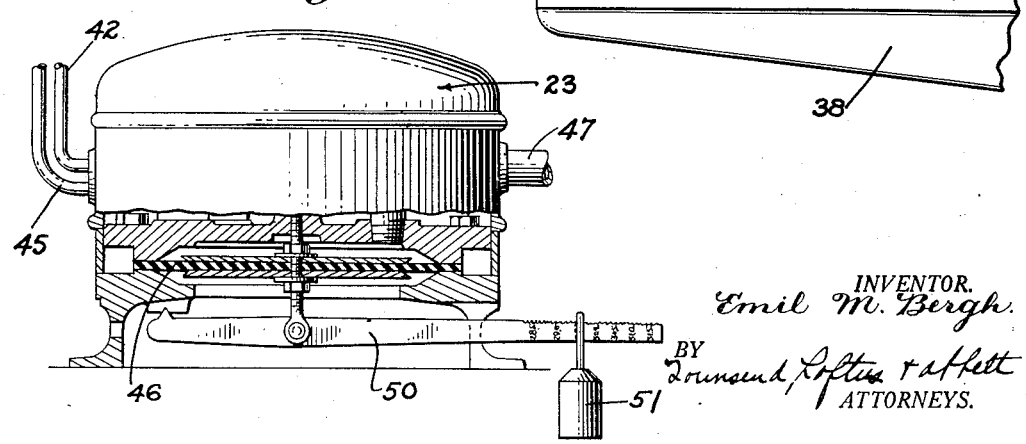
INVENTOR.
Emil M. Bergh.
BY Townsend Loftus + Haffett
ATTORNEYS.

Patented Mar. 15, 1932

1,849,267

UNITED STATES PATENT OFFICE

EMIL M. BERGH, OF CROCKETT, CALIFORNIA

CONTROL FOR EVAPORATING APPARATUS

Application filed January 29, 1930. Serial No. 424,247.

My present invention relates to apparatus and a method of operation for maintaining a constant absolute pressure in an evaporating apparatus and more particularly to an improvement upon the regulating apparatus shown and covered by a co-pending application filed by William C. Shield January 16, 1929, Serial Number 332,852.

An object of my invention is to provide an improved apparatus by means of which a constant absolute pressure may be maintained in vacuum pans such as are used for the crystallization of sugar and the like, irrespective of atmospheric changes.

Another object of my invention is to provide a regulating apparatus in connection with a barometrically controlled evaporating apparatus, a means to compensate for atmospheric pressure changes, whereby a constant absolute pressure may be maintained in the evaporating apparatus.

A further object of my invention is to provide a new and improved apparatus which, in conjunction with a vacuum pressure regulator, will maintain a constant absolute pressure in an evaporator, irrespective of changes in the atmospheric pressure.

Another object of my invention is to provide a new and improved compensating means for vacuum regulators which will render the regulator capable of maintaining a constant absolute pressure within the regulated apparatus.

In connection with the evaporation and crystallization of sugar, it is desirable, in order to avoid a scorching thereof, to carry out the evaporation at a comparatively low temperature and, since it is well known that the boiling point of a liquor may be reduced by reducing the pressure in the boiling apparatus, it is the present practice to maintain a vacuum within the evaporating pan during the evaporating operation.

In other words, because of the destructive effect of high temperatures upon a sugar solution, the sugar boiling is always carried out at as low a temperature as is practicable. The apparatus used for this purpose is therefore so constructed and arranged that the boiling may be carried out at a pressure considerably less than atmospheric. In other words, the boiling is maintained in evacuated vessels commonly termed "vacuum pans".

It is customary to measure and to express this pressure in the vacuum pan in "inches of vacuum", or in other words, inches of mercury column. As this mode of expression in reality refers to the difference between the atmospheric pressure and the absolute pressure in the apparatus, the so-called "inches of vacuum" indication should vary exactly with the variations in the atmospheric pressure, if the absolute pressure within the pan were to remain constant. On the other hand, if this difference, i. e., the vacuum, is maintained constant, then the absolute pressure within the pan will vary with the atmospheric pressure and hence also the boiling temperature, because the latter is dependent upon the absolute pressure.

The many variable factors which affect the crystallization of sugar have been well known to sugar technicians for a number of years, and a long experience in the "art" of practical sugar boiling suggests to me the desirability of removing some of these variables, by bringing them under automatic control.

Of these variables, the absolute boiling pressure seemed to be the one which, if automatically controlled, would remove from the boiling of sugar the greatest amount of uncertainty as to result, and thus provide the first and most important step toward the standardization of the technique of this important phase of the manufacture of sugar.

The automatic vacuum regulator disclosed in the above referred to application filed by William C. Shield is designed to and does successfully maintain a constant vacuum in the pan under varying atmospheric pressure changes, but since, as suggested above, it is the absolute pressure within the pan which controls the boiling temperature, it it is desirable that means be provided to compensate for atmospheric changes after the vacuum regulator has been adjusted at a predetermined atmospheric pressure. This is provided by the present invention, and when the arrangements disclosed by me have been applied to the Shield apparatus, the control of the absolute pressure in the pan is complete.

It may be well to emphasize at this point that automatic control of sugar boiling would not be possible without automatically controlled absolute boiling pressure.

During a series of sugar boiling experiments conducted by me, it was found that even the ordinary variations in the atmospheric pressure would render any automatic control of the vacuum in the vacuum pan valueless as an aid to controlled sugar boiling. The reason for this will be clearly seen from the following discussion.

The crux of controlled sugar boiling is the maintenance, at any given stage of the boiling, of that concentration of the sugar solution which is known to give the most satisfactory results, but as both the absolute boiling pressure and the concentration affect the boiling temperature, it follows that the former must be constant in order that the latter may be used as an indication of the concentration of the solution.

In the apparatus covered by the above referred to application by William C. Shield, which apparatus is herein illustrated and will be later described, there is provided a barometric condenser which functions in combination with a suitable vacuum pump to maintain a vacuum within the vacuum pan. An automatic vacuum regulating means is also provided which operates to control the condensing operations of the condenser so that a substantially constant vacuum is maintained within the evaporating pan. This apparatus has been found to operate very satisfactorily so long as there are no changes in the atmospheric pressure during the evaporating operations. However, where there is any change in atmospheric pressure during the evaporating operation, this apparatus will not compensate for any such change and as a result a constant absolute pressure will not be maintained within the pan and, as has been suggested above, the absolute pressure within the pan will therefore vary in accordance with atmospheric pressure changes.

It is this aspect of the above disclosed apparatus that my present invention is aimed to improve. This I accomplish by providing a means which will operate in conjunction with the above referred to apparatus to compensate for atmospheric changes in such a manner that the device will be rendered operative to maintain a constant absolute pressure within the vacuum pan rather than a constant value of vacuum.

For a better understanding of my invention, reference should be had to the accompanying drawings, wherein I have shown by way of illustration and not of limitation, preferred embodiments thereof.

In the drawings—

Fig. 1 is a view in elevation with parts broken away showing the interior construction, Fig. 2 is a sectional view in elevation showing a portion of the regulating apparatus, and Fig. 3 is a modified form of the pressure responsive device illustrated in Figs. 1 and 2.

In order to facilitate an understanding of my invention, I have shown one embodiment of my invention in Fig. 1 of the drawings as applied to an evaporator of the type particularly well suited to use in connection with the evaporation and crystallization of sugar. The evaporator proper is designated by the numeral 10. This evaporator is provided with a heating means in the form of coils of pipe which are adapted to be heated by the admission of steam thereto from any suitable source 11. The top of the evaporator pan 10 communicates with a suitable trap 12 and communicating with the other side of the trap 12 I have shown a condenser 13 which is particularly well suited to the carrying out of my invention. The trap 12 obstructs the passage of heavy vapors from the evaporator 10 to the condenser 13 and a drain 14 is provided for carrying away any accumulation of liquid within the trap 12. Connected near the bottom of the condenser 13 for the purpose of creating a vacuum within the evaporator 10 and condenser 13, there is provided a suitable vacuum pump 15. The condenser 13 is also shown as provided with a spray producing nozzle 16 which is connected to a source of cooling water supply 17. Interposed in the water supply source there is provided a normally open pneumatically operated valve 18. This valve is adapted to control the flow of condensing water to the condenser and will be controlled in an automatic manner by means of the pressure responsive valve controlling means to be described hereinafter. Arranged below the nozzle 16 there is also provided within the condenser 13, a series of alternately arranged baffles 19 and 20 which serve to maintain a substantially uniform distribution of the spray throughout the length of the condenser 13. A discharge outlet pipe 21 is also shown as connected to the bottom of the condenser 13 which serves to carry away the condenser vapors and condensing water from the condenser. The outlet of this discharge pipe 21, it is to be understood, operates in connection with a water seal arranged a sufficient distance below the condenser so as not to interfere with the maintenance of a vacuum therein. In connection with the above, it will be understood that under ordinary circumstances, when the above described apparatus is in operation, it will be possible, by means of the pump 15, to maintain a vacuum within the evaporating pan 10, but, owing to the fact that as a result of the evaporation which takes place in the evaporator 10, vapors will be given off which will seriously interfere with the successful operation of the pump 15, it is necessary to provide some means to compensate for this vaporization and assist the pump in maintaining the vacuum. It is at this point that the condenser 13 comes into operation as it assists the vacuum pump during the evaporating operation by condensing the hot vapors given off from the evaporating pan in a manner well known in the art.

In order that the condensing action of the condenser 13 may be controlled in an entirely automatic manner, I propose to provide a fluid column supporting pipe 22 which communicates with the interior of the evaporator 10. The water column supporting pipe 22 is of such a height that the water contained therein will have a weight corresponding to the vacuum desired to be maintained within the evaporator 10 and connected at the lower end thereof I provide a suitable automatically operated pressure responsive valve controlling mechanism 23 which will be described in more detail in connection with Fig. 2 of the drawings.

In the drawings the water column retaining pipe 22 is shown as having an enlarged head or reservoir 24 from which a plurality of conduits 25, 26, 27 and 28 project at different heights and communicate with the condenser 10 through a pipe 29. These conduits serve to cut off the liquid column at heights above the pressure responsive mechanism 23 so as to produce water columns corresponding in height, respectively, to 23, 24, 25, and 26 inches of mercury, or, in other words, at substantially the following heights in feet, respectively, 26.0, 27.2, 28.3 and 29.5. Each of the conduits 25, 26, 27, and 28 is shown as provided respectively with valves 30, 31, 32 and 33 and connected to the reservoir 24 above these conduits there is also provided an additional pipe 34 which communicates with the evaporator 10 for the purpose of breaking any siphoning action which might prevent a draining of the conduits 25, 26 and 27 of any water which might interfere with the proper functioning of the water column maintained within the pipe 22 and reservoir 24. In order to insure against a diminution of the water in the water column pipe 22, I provide a source of water supply which enters the bottom of the column through a pipe 35. This source of water supply for the liquid column is so regulated that water will flow thereto slowly in a continuous manner and thus maintain the height of the column uniform, the excess water flowing over one of the by-pass conduits and into the condenser, where it is discharged from the outlet thereof.

The above described apparatus, with the exception of reservoir 24, is in practically every respect similar to the disclosure contained in the above referred to prior application. My present invention may be stated to consist of the following improved features. The reservoir 24 has been provided so that the apparatus will maintain a more constant fluid pressure head as the diaphragm in the pressure responsive mechanism 23 moves up and down, this being accomplished by providing that the reservoir 24 have a diameter substantially equal to the diameter of the flexible diaphragm of the pressure responsive device 23. This arrangement makes the complete installation more responsive to atmospheric changes, as it will be readily understood that the fluid column maintained in the pipe 22 and reservoir 24 will not vary to such a large extent as would be the case if only the pipe 22 were provided.

In Fig. 1 of the drawings, it will also be noted that the pressure responsive device is maintained upon a suitable pedestal 36 so that it may be raised and lowered with respect to the pipe 22 and thus vary the effective head of the liquid column contained in the pipe 22 and reservoir 24. This movement of the pressure responsive device 23 is made possible by reason of the flexible connection or hose 37 between it and the lower end of the pipe 22. Co-operating with the pedestal 36, I show a suitable support 38 upon which the pressure responsive device 23 is mounted. This support is provided with a crank 39 by means of which it may be raised and lowered upon the pedestal 36 and adjacent to pointer 40 upon the support 38 there is provided a scale 41 which is calibrated to correspond to a predetermined range of barometric indications. A second flexible connection or hose 42 connects with an air valve 43 within the pressure responsive device 23 to supply air through a pipe 44 to the pressure operating mechanism of the valve 18. A further flexible connection or pipe 45 also extends from the air valve of the pressure responsive device 23 to a suitable source of pneumatic pressure (not shown).

By referring to Fig. 2 of the drawings, it will be seen that the pressure responsive device 23 comprises a suitable casing in which there is mounted a diaphragm 46. The lower side of the diaphragm 46 is exposed to the atmosphere and the upper side thereof is exposed to the pressures exerted by the water column 22 and reservoir 24 through the inlet 47 shown in this view of the drawings. Attached to the center of the diaphragm 46 and extending upwardly there is provided a suitable operating rod 48 which, in conjunction with a bell crank 49, is adapted to operate the air valve 43 to open and close the same as the diaphragm flexes respectively upwardly and downwardly. With this arrangement it will be seen that as the vacuum within the pan 10 varies, the lifting effect upon the column of water in the pipe 22 and reservoir 24 will also vary and, as a result, the diaphragm 46 will be caused to move in response to these changes and open and close the air valve 43, which in turn will cause the automatic valve 18 to operate and control the condensing action of the condenser 13 and maintain the vacuum within the pan 10 substantially constant at any predetermined vacuum as determined by which of the conduits 25, 26, 27, or 28 are opened.

From the above it will be readily appreciated that once the pressure responsive device 23 is placed in operation, it will function to maintain the particular predetermined vacuum within the evaporating pan 10, irrespective of atmospheric pressure changes. However, since as previously suggested, it is desirable that a constant absolute pressure be maintained in the evaporating pan rather than a constant vacuum, it will be seen that some means must be provided to compensate for atmospheric pressure variations. This I propose to accomplish by providing, as previously described, a means whereby the pressure responsive device 23 may be raised and lowered in accordance with the barometric readings throughout the evaporating operation.

Another manner of accomplishing this adjustment in the pressure responsive device 23 is illustrated in Fig. 3 of the drawings. In this embodiment, instead of raising and lowering the pressure responsive device with respect to the top of the water column maintained in the pipe 23 and reservoir 24, I provide a suitable beam or lever 50, upon which there is suspended a suitable weight 51, the forces of which are applied upon the diaphragm 46 so as to counteract the effect of atmospheric pressure upon the dipahragm and/or assist the water column maintained in the reservoir 24 in operating the diaphragm.

The above aspects of my present disclosure, by means of which I maintain a constant absolute pressure within the evaporating pan, may be had from the following description. If we consider for the moment the vacuum regulating aspects of this apparatus and assume for an instant that on one side of the diaphragm the pressure consists of an atmospheric pressure equivalent to 30 inches of mercury which is counterbalanced on the other side of the diaphragm by a water column equivalent to a 26 inch mercury column plus the absolute pressure in the pan, it will be evident that when equilibrium exists, the absolute pressure in the pan must be equivalent to a 4 inch mercury column. If we now assume that the atmospheric or barometric indication changes to 29.5 inches of mercury and the water column remains as before at 26 inches of mercury, the absolute pressure in the pan will be automatically changed to 3.5 inches of mercury, while the vacuum, i. e., the difference between the atmospheric pressure and the absolute pressure within the pan will remain at 26 inches of mercury. Now, in order to maintain the absolute pressure constant at 4 inches of mercury, it will be evident that it will be necessary to add to the atmospheric side of the diaphragm 46 a compensating pressure equal to 0.5 inches of mercury per square inch. This I accomplish by the above suggested change in elevation of the pressure responsive device, as shown in Fig. 1, or by an adjustment of the weight 51 along the beam 50 illustrated in Fig. 3. It may be here stated that this adjustment can be accomplished by other agencies, for instance, a suitable compensating weight may be applied directly to the diaphragm or an adjustable spring mechanism may be provided.

A practical application of my invention is illustrated by the following:

An atmospheric pressure of 30 inches of mercury column is equivalent to 14.7 pounds absolute pressure per square inch, or, $$\frac{14.7}{30} = 0.49$$ pounds per square inch for every inch of mercury column;

and $$\frac{0.49}{10} = 0.049$$ pounds per square inch for every tenth of an inch mercury column.

A diaphragm of 10 inches diameter has an area of 78.540 square inches, and an atmospheric pressure variation of 0.1 inch represents therefore a total pressure variation on the diaphragm surface of:

$$78.540 \times 0.049 = 3.848 \text{ pounds.}$$

From a study of the design of the vacuum regulator it will be evident that if this atmospheric pressure variation of 0.1 inch is a positive one, i. e., if the change is from 30.0 inches to 30.1 inches, the pin operating the pilot air valve is moved by a force equal to 3.848 pounds in such a direction that the pilot air valve causes the absolute pressure in the pan to be increased by 0.1 inch mercury column as an increase of air pressure will close valve 18 more.

Naturally, a reduction of the atmospheric pressure will correspondingly decrease the absolute pressure in the pan, while the vacuum is maintained constant.

Therefore, from the above it will be evident that the effect of atmospheric pressure variations on the absolute pressure in the pan may be offset by the application on the diaphragm pin of a force equal and opposed to that which, as a result of the atmospheric pressure variation, would have resulted in a corresponding change in the absolute pressure in the pan.

A practical example of the apparatus illustrated in Fig. 3 of the drawings may be set forth as follows: If we assume a sliding weight and a beam, as here illustrated, with divisions upon the beam one inch apart for every 0.1 inch variation in the pressure compensation, the weight of the sliding weight may be calculated as follows:

Assuming a fulcrum of 3 inches, $$\frac{2x}{3} = \frac{3x}{3} - 3.848$$

$$x = 11.544 \text{ pounds.}$$

From this it will be seen that the sliding weight must be 11.544 pounds, and when this weight is moved 5 inches on the beam, the compensation effected on the diaphragm is equivalent to an atmospheric pressure variation of 0.5 inches, etc.

Naturally, any convenient division and fulcrum distance may be chosen. With the one above illustrated, the divisions upon the beam may be designated by numerals which are representative of the true barometer readings. This latter feature is also true of the calibrations upon the pedestal 36 used in conjunction with the apparatus illustrated in Fig. 1. With this arrangement it will be readily seen that when the apparatus is in operation, assuming that the vacuum controlling apparatus has been previously set to maintain a certain predetermined vacuum within the pan, all the operator need then concern himself with during the evaporating period is to check the barometer readings periodically and adjust the water column or the weight so that the pointer 40 or the weight 51 is positioned to correspond with the barometer reading.

While I have, for the sake of clearness and in order to disclose my invention so that the same can be readily understood, described and illustrated specific devices and arrangements, I desire to have it understood that this invention is not limited to the specific means disclosed, nor is it limited to the specific application referred to, that is, the evaporation and crystallization of sugar syrups, as it will be readily understood that the apparatus may be embodied in other forms and that other materials such as other fruit juices and like materials which are thickened or condensed by evaporation may be treated. For instance, the apparatus might be used for condensing milk. It is believed that this invention is broadly new and it is desired to claim it as such so that all such changes as come within the scope of the appended claims are to be considered as part of this invention.

Having thus described my invention, what I claim and desire to secure by Letters Patent is:—

1. In sugar refining apparatus, the combination of an evaporating pan, means for producing a vacuum within said pan, a pressure responsive device adapted to maintain the vacuum in said pan at a predetermined relative value with respect to a changing atmospheric pressure, and means whereby said pressure responsive device may be adjusted to compensate for atmospheric pressure changes whereby a substantially constant absolute pressure may be maintained in said pan.

2. In a regulator system for maintaining a substantially constant absolute pressure in evaporating pans the combination of an evaporating pan, a vacuum pump, a barometric condenser co-operating with said pump for maintaining the vacuum within said pan, a pressure responsive means for controlling the operation of said barometric condenser tending to maintain the vacuum in said pan at a predetermined relative value below a changing atmospheric pressure, and means whereby said pressure responsive means may be adjusted to compensate for atmospheric pressure variations to maintain a substantially constant absolute pressure within said pan.

3. In an absolute pressure control system, the combination of apparatus adapted to be maintained at a reduced absolute pressure, a diaphragm connected in communication with the interior of said apparatus adapted to maintain a predetermined vacuum therein under uniform atmospheric pressure conditions, and means associated with said diaphragm adapted to vary its range of operation when adjusted to correspond to a change in atmospheric pressure, whereby a constant absolute pressure may be maintained in said apparatus.

4. In a regulating system for maintaining a constant absolute pressure within evaporating apparatus, the combination of a diaphragm in communication with the interior of said apparatus on one side and exposed to atmospheric pressure on the other, a liquid column between said diaphragm and said apparatus adapted to determine the vacuum within said apparatus, and means associated with said diaphragm adapted to be adjusted to compensate for atmospheric pressure changes whereby a substantially constant absolute pressure may be maintained in said apparatus.

5. In a regulating system for maintaining a constant absolute pressure within evaporating apparatus, the combination of a diaphragm in communication with the interior of said apparatus on one side and exposed to atmospheric pressure on the other, a liquid column between said diaphragm and said apparatus adapted to determine the vacuum within said apparatus, and means associated with said diaphragm adapted to be adjusted to compensate for atmospheric pressure changes and co-operate with said water column whereby a substantially constant absolute pressure may be maintained in said apparatus.

6. In combination with a vacuum system, a regulator comprising a diaphragm communicating on one side with the chamber in which a vacuum is to be maintained, a water column within said communicating passage adapted to co-operate with said diaphragm and control its operation, and a reservoir at the top of and communicating with said water column having a diameter at least equal to the diameter of said diaphragm whereby variations in said liquid column due to movements of the diaphragm will be reduced to a minimum.

EMIL M. BERGH.